Patented Sept. 5, 1922.

UNITED STATES PATENT OFFICE.

ALFRED STOCK, OF BERLIN-DAHLEM, AND HANS GOLDSCHMIDT, OF BERLIN, GERMANY.

PROCESS FOR ELECTRICALLY MANUFACTURING COMPACT METALLIC BERYLLIUM.

No Drawing.  Application filed May 12, 1922.  Serial No. 560,452.

*To all whom it may concern:*

Be it known that ALFRED STOCK and HANS GOLDSCHMIDT, subjects of the German Republic, residing at 4 Im Gehege, Berlin-Dahlem, Germany, and 13 Bellevuestrasse, Berlin W. 9., Germany, have invented certain new and useful Improvements in a Process for Electrically Manufacturing Compact Metallic Beryllium, of which the following is a specification.

Up to the present time no process is known for the direct manufacture of compact beryllium, publications relating to the manufacture of metallic beryllium being wholly unreliable. The known processes do not give anything approximating pure beryllium. The first reliable work in connection with the manufacture of beryllium was that of Lebeau, continued by Fichter. According to the "Berichte der Deutschen Chemischen Gesellschaft" 46; 1604/1913, Fichter produced beryllium in the form of spangles or paillettes, (which he subsequently melted) by electrolyzing a molten double fluoride of sodium and beryllium. He did not succeed however in directly obtaining compact beryllium therefrom, as the electrolytic bath he used did not allow temperatures approximating that of the melting point of beryllium. Pure beryllium as manufactured by Fichter had physical properties such as brittleness, melting point, electric conductivity and the like, which are quite different from those which had previously been attributed to beryllium; an indication that probably no one had produced pure beryllium before.

After numerous experiments applicants have found that compact pure beryllium can be directly and easily manufactured by electrolyzing a fused mass or melt, containing a halide of beryllium, the other essential component of which is alkali earth fluoride, preferably barium fluoride. A melt of this kind can be heated to a temperature above the melting point of beryllium (about 1280° C.) without any disturbing evaporation taking place and without becoming hydrolyzed by the action of air. The said fused mass is fluid and remains clear even at a high temperature; moreover beryllium oxide is soluble therein, an important point as regards replacing the beryllium separated by electrolysis.

The process according to the present invention is quite different from that described in the German Patent No. 101,326 of Dr. Louis Liebmann, dated 9th of February, 1898, which process is based on the fact that fluorine compounds have the power of separating silicic acid from beryllium minerals in their natural state, thus converting them into a state in which they can be reduced. In other words, silicon is removed by reaction with fluoride which volatilizes compounds, forming silicon fluoride.

As an example, the process according to our present invention may be carried into practice as follows:

A crucible made of suitable material (e. g., graphite) is used first for melting double fluoride of sodium and beryllium, which has a low melting point; then double fluoride of barium and beryllium is added in the form of several successive small additions. When the bath reaches a temperature of about 1200 to 1300° C., electrolysis is started. The beryllium thereby separated is replaced (i. e., the baryllium compound used up is replenished) by adding double fluoride of barium and beryllium, or of sodium and beryllium or beryllium oxide. A hollow water-cooled rod made of iron for instance may advantageously be used as a cathode on which compact barium free beryllium is separated in a state of purity of about 99 to 100% Bé. Notwithstanding the extraordinarily high working temperature involved in the process and at which it was hitherto considered impossible to carry out any electrolytic smelting process, there occurs the surprising and unexpected result that the metal undergoes no disintegration (clouding) in the electrolyte. The bath is such that the current is sufficiently intense to allow the bath to be kept at the required temperature by means of the electric current only. Even in small baths the electrolytic efficiency in beryllium is about 80% of the theoretical and the same electric current can be used to deposit the beryllium and also to keep the bath at the desired temperature as above stated.

In a particular experimental run of the process, a crucible made of Acheson graphite was used as the anode and iron (water cooled) was used as the cathode. The amount of fused mixture of sodium-beryllium fluorid, barium fluorid and beryllium fluorid, used was 50 grams. The temperature was about 1290° C. The current was maintained at 40 amperes with a voltage of 50.

This example is, of course, not intended as limiting the invention to the details, since the preferred voltage and amperage should be varied depending on the size of the installation. The other conditions can also be varied.

We claim:

1. A process of electrolytically producing beryllium which comprises electrolyzing a fused bath containing essentially an alkaline earth metal fluorid and a beryllium compound.

2. A process of electrolytically producing beryllium which comprises electrolyzing a fused bath containing essentially an alkaline earth metal fluorid and a beryllium compound, said bath having a high melting point, and being maintained at about 1200° to 1300° C.

3. A process of electralytically producing beryllium which comprises electrolyzing a fused bath containing essentially barium fluorid and a beryllium compound.

4. A process of electrolytically producing beryllium which comprises electrolyzing a fused bath containing essentially an alkaline earth metal fluorid and beryllium fluorid.

5. In the process of claim 1, the step of adding a beryllium compound to the bath during the electrolytic process, to replace that used up.

6. In the process of claim 1, the step of adding beryllium and fluorine compound to the bath during the electrolytic process, to replace that used up.

7. A process of electrolytically producing beryllium which comprises electrolyzing a fused bath containing essentially an alkaline earth metal fluorid and an alkali metal fluorid and a beryllium compound.

In testimony whereof we affix our signatures in presence of two witnesses.

ALFRED STOCK.
HANS GOLDSCHMIDT.

Witnesses:
ARTHUR SCHOLTZ,
LORINE EUSIN.